Nov. 3, 1931.  A. STORM ET AL  1,830,724
JIG FOR BORING CONNECTING RODS
Filed June 14, 1928  4 Sheets-Sheet 1
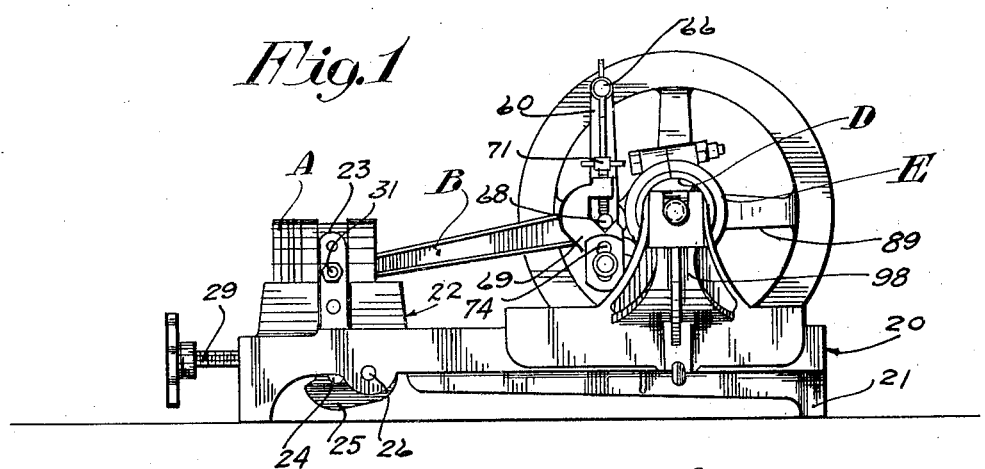
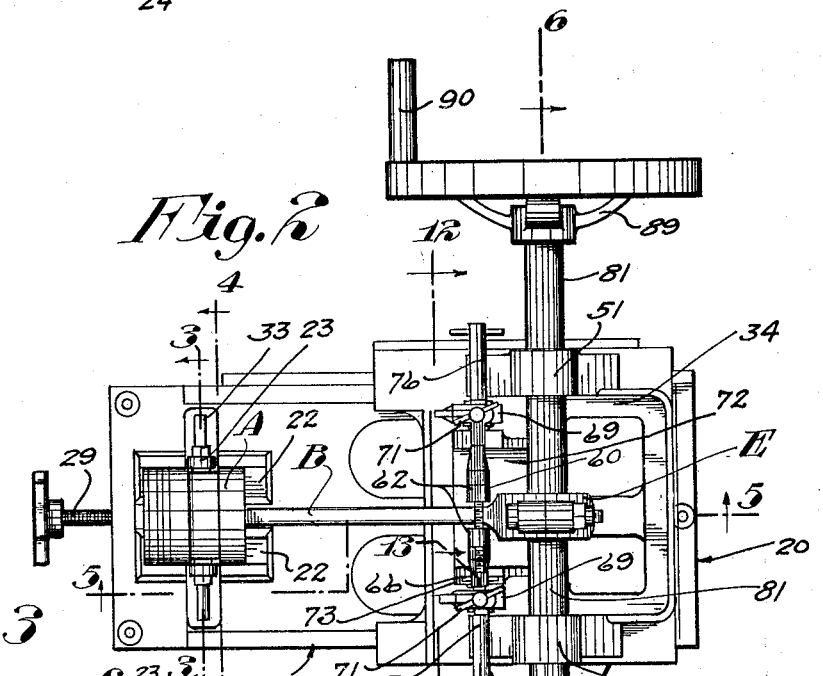
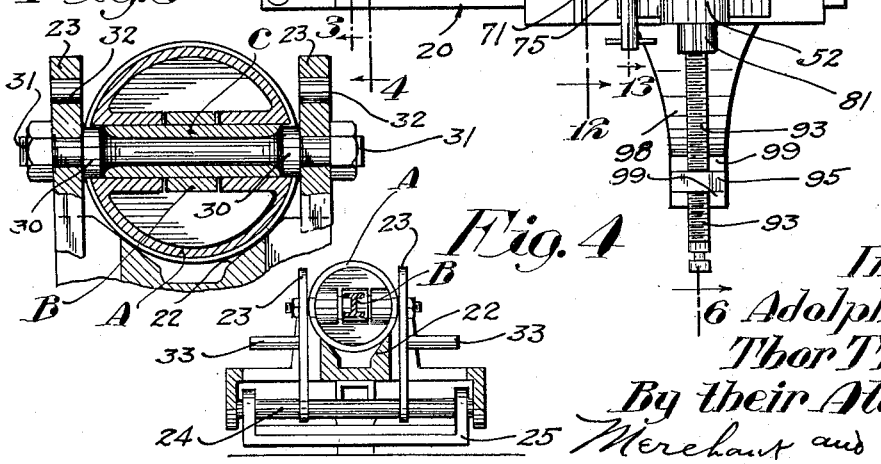
Inventors
Adolph Storm
Thor Thorson
By their Attorneys Nov. 3, 1931.　　A. STORM ET AL　　1,830,724
JIG FOR BORING CONNECTING RODS
Filed June 14, 1928　　4 Sheets-Sheet 2
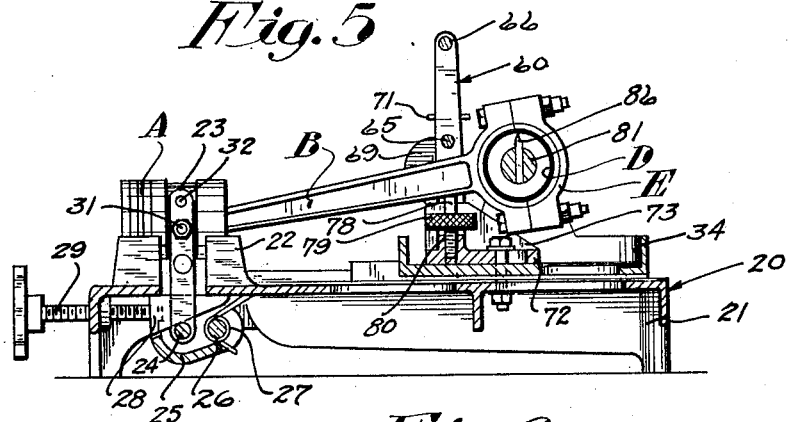
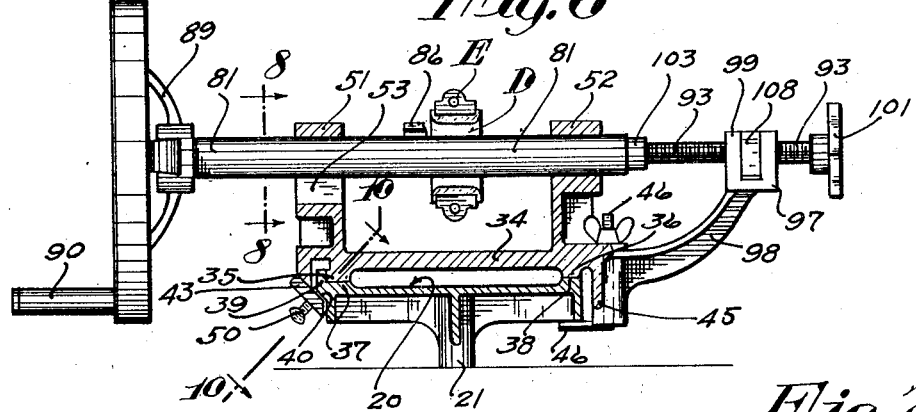
Inventors
Adolph Storm
Thor Thorson
By their Attorneys
Merchant and Kilgore Nov. 3, 1931. A. STORM ET AL 1,830,724
JIG FOR BORING CONNECTING RODS
Filed June 14, 1928 4 Sheets-Sheet 3

Inventors
Adolph Storm
Thor Thorson
By their Attorneys
Merchant and Kilgore

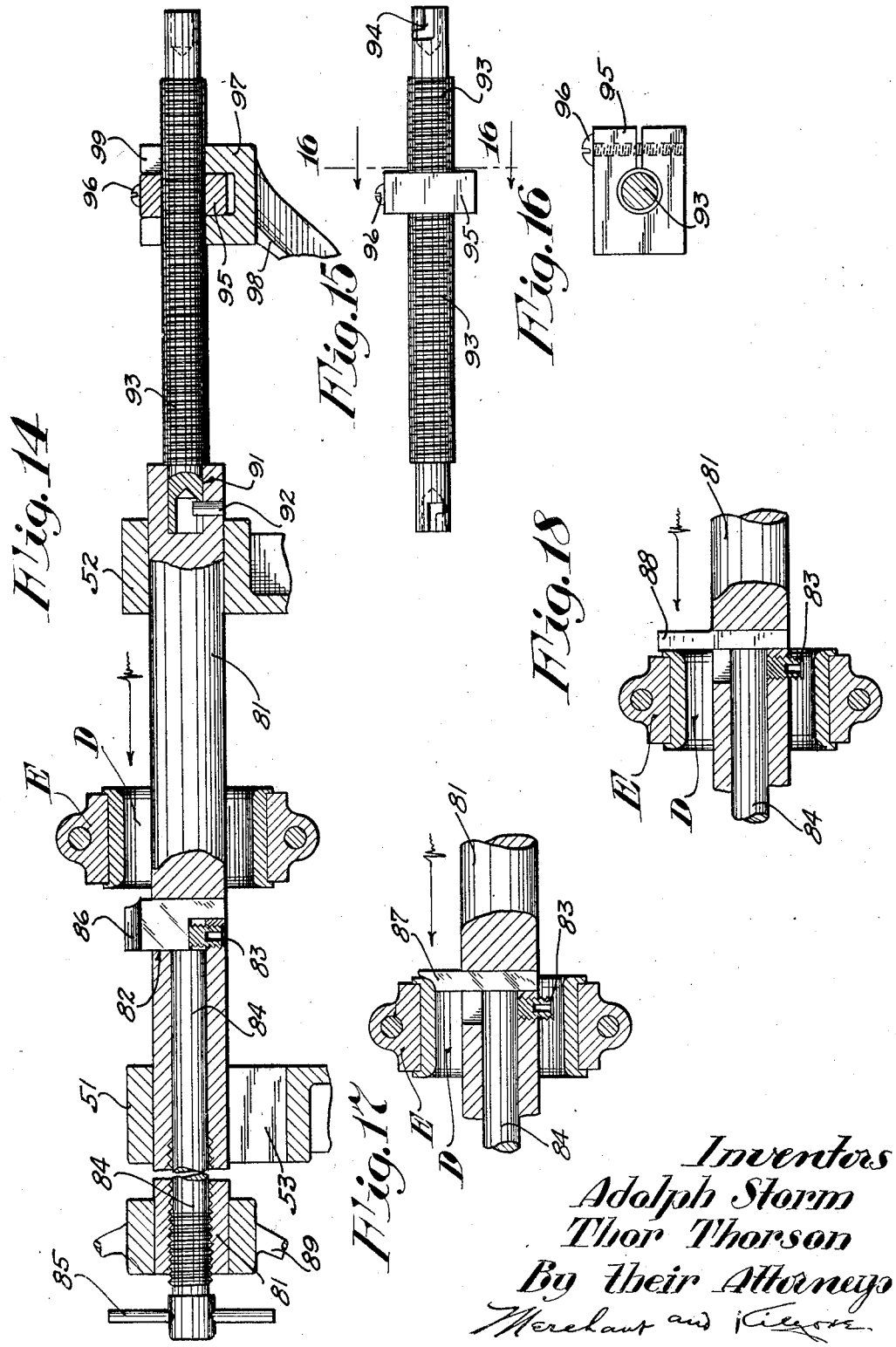

Patented Nov. 3, 1931

1,830,724

UNITED STATES PATENT OFFICE

ADOLPH STORM AND THOR THORSEN, OF MINNEAPOLIS, MINNESOTA, ASSIGNORS TO STORM MANUFACTURING CO., INC., OF MINNEAPOLIS, MINNESOTA, A CORPORATION OF MINNESOTA

JIG FOR BORING CONNECTING RODS

Application filed June 14, 1928. Serial No. 285,302.

Our present invention has for its object the provision of a relatively simple and highly efficient jig for holding and aligning piston assemblies and for centering the crank shaft bearing of the connecting rod of a piston assembly and for centering and holding a tool for finishing the crank shaft bearing.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a side elevation of the jig and a piston assembly mounted therein;

Fig. 2 is a plan view of the same;

Fig. 3 is a fragmentary detail view principally in section taken on the line 3—3 of Fig. 2, on an enlarged scale;

Fig. 4 is a transverse section taken substantially on the irregular line 4—4 of Fig. 2;

Fig. 5 is a view partly in side elevation and partly in longitudinal vertical section taken on the line 5—5 of Fig. 2;

Fig. 6 is a view partly in elevation and partly in transverse vertical section taken on the line 6—6 of Fig. 2;

Fig. 7 is a fragmentary detail view with some parts in central longitudinal section showing the connecting between the boring bar and screw feed therefor;

Fig. 8 is a fragmentary detail view with the boring bar sectioned on the line 8—8 of Fig. 6;

Fig. 9 is a perspective view of the anchoring plate;

Fig. 10 is a view partly in elevation and partly in section taken on the line 10—10 of Fig. 6;

Fig. 14 is a fragmentary view partly in transverse vertical section and partly in elevation showing the boring bar and feed screw therefor, as illustrated in Fig. 11;

Fig. 15 is an elevation of the screw feed removed from its bearing and boring bar;

Fig. 16 is an elevation of the nut block for the feed screw, said feed screw being sectioned on the line 16—16 of Fig. 15;

Fig. 17 is a fragmentary detail view principally in section showing the boring bar adjusted for filleting the bushing;

Fig. 18 is a view corresponding to Fig. 17 but showing the boring bar adjusted for finishing the outer faces of the bushing.

Figure 11:
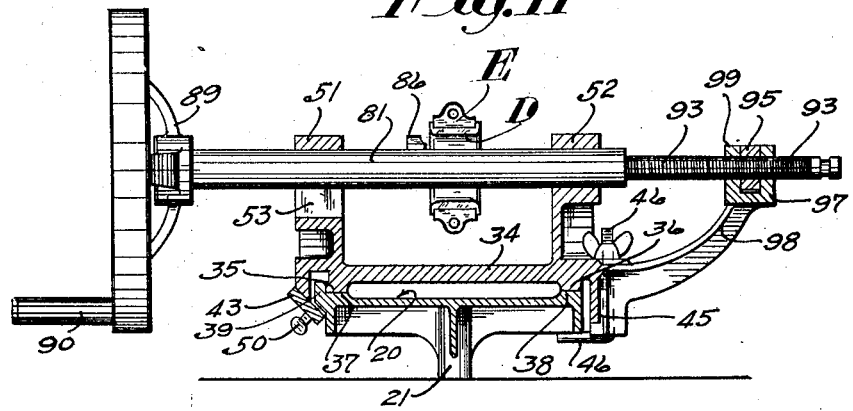
Fig. 11 is a view corresponding to Fig. 6 but showing another type of the feed screw for the boring bar.

The piston assembly illustrated in the drawings includes a piston A, connecting rod B, wrist pin C, split babbitted bushing D in the two-part connecting rod bearing E on said connecting rod. The wrist pin C is rigidly held in the connecting rod B in the customary manner and is turnably mounted in the bearings therefor in the piston A and it is important to note that the length of the wrist pin C is less than that of the diameter of the piston A.

Referring now in detail to the invention the numeral 20 indicates a cast bed having three short supporting legs 21 in which are formed vertical holes adapted to receive bolts, not shown, for rigidly securing the jig to a bench or other support. Integrally formed with the bed 20 near one end thereof is a way 22 comprising a pair of longitudinally extended and laterally spaced guides, the opposing faces of which are in upwardly diverging relation transversely of said bed and milled to afford supporting surfaces for holding the piston A with its axis extending parallel to said bed at the transverse center thereof.

The piston A is rigidly held in a horizontal position on the way 22 by a pair of laterally spaced vertical arms 23 which project upward through apertures in the bed 20 and open intermediate notches in the outer faces of the way 22. Said arms 23 at their lower ends are pivoted on a transverse lower shaft 24 for vertical swinging movement transversely of the bed 20 and for lateral adjustment toward and from each other transversely of the bed 20. This shaft 24 is rigidly held in a frame 25 attached to the under side of the bed 20 by means of a horizontal hinge bolt 26 for vertical swinging movement, longitudinally of said bed. A coiled spring 27 encircling the hinge bolt 26 with one of its ends engaging the bed 20 as a base of resistance and its other end engaging the spring 27 is under tension to lift said frame toward the bed and raise the arms 23.

To swing the frame 25 downward against the tension of the spring 27 and thereby lower the arms 23 a wedge block 28 is inserted between the bed 20 and shaft 24 for movement longitudinally of the bed 20. This wedge block 28 engages the bed 20 as a base of resistance with its oblique face transversely engaging the shaft 24. Said wedge block 28 may be either projected or retracted by a hand-wheel-equipped screw rod 28 swiveled to said wedge block and having screw-threaded engagement with the bed 20.

On the opposing faces of the arms 23 is a pair of axially aligned anchoring studs 30 which extend into the outer end portions of the wrist pin seats in the piston A and hold said piston on the way 22 with the axis of the wrist pin C parallel to the bed 20. These anchoring studs 30, as shown, are in the form of heads on nut-equipped bolts 31 removably mounted in either one of two pairs of upper and lower holes 32 in the arms 23. A pair of handles 33 by which the arms 23 may be manipulated are secured to said arms at their intermediate portions and which handles are axially aligned and project laterally outward from said arms.

Obviously, by adjusting the screw rod 29 to force the wedge block 28 between the head 20 and shaft 24, the arms 23 will be drawn downward by the movement of the frame 25 and rigidly hold the piston A on the way 22 with the axes of said piston and wrist pin in a plane parallel to the bed 20.

The purpose of mounting the arms 23 on the shaft 24 for lateral adjustment in respect to each other and for mounting the anchoring studs 30 on the arms 23 for longitudinal adjustment is to hold pistons of different diameters on the way 22. In case the piston to be aligned on the way 22 is provided with a wrist pin, the ends of which are flush or substantially flush with the periphery of the piston anchoring studs adapted to enter the tubular wrist pin may be substituted for the anchoring studs 30. With the piston A properly aligned and rigidly held as above described, the connecting rod B is tested for bend or torque.

For the purpose of this case it is not thought necessary to show the gauge that is applicable to the jig and the co-operating arbor that is applicable to the bushing D for testing the connecting rod 5 for bend or torque. Neither is it thought necessary to show the tools for straightening the connecting rod or for taking out the torque.

After the connecting rod B has been straightened and the torque taken out, if any, so that the axis of the bushing D is parallel to the axis of the wrist pin C and the bed 20, the gauge and arbor are removed from the bushing D and said bushing held centered, as will hereinafter appear.

A carriage 34 is mounted on the bed 20 for sliding movement longitudinally toward and from the way 22 and has on its under side at its longitudinal edge portions a pair of longitudinally extended shoes 35 that slidably rest on a pair of low flat rails 36 and 37, respectively, integrally formed with the top of the bed 20. Also integrally formed with the bed 20 at the outer longitudinal edge portion of the rail 37 is an upstanding guide flange 39 with which the outer edge portion of the shoe 35 slidably contacts to hold the carriage for straight-line sliding movement.

To hold the shoe 35 on its rail 37 and against the guide flange 39, an oblique way 40 is formed on the lower edge portion of said flange outward of the bed 20 and on which way a ball-bearing 41 rests for longitudinal travelling movement. This bearing 41 is mounted in a cage 42 rigidly secured to an oblique retaining bar 43 at substantially the longitudinal center thereof. Said retaining bar 43 is rigidly secured by screws to the carriage 34, extends under the way 40 and parallel thereto with just sufficient clearance so that only the ball-bearing 41 is in contact with said way. Integrally formed with the carriage 34 is a longitudinally extended depending flange 45 which overlaps the respective side of the bed 20 outward of the rail 38 and is spaced outward thereof.

An L-shaped retaining bolt 46 has its body portion loosely mounted in a vertical hole in a boss 47 on the outer face of the flange 45 at substantially the longitudinal center thereof. The lower or horizontal portion of the bolt 46 lies in a groove 48 formed in the lower end of the boss 47 and which groove holds the bolt 46 from turning about its longitudinal axis. A thumb nut 49 is applied to the upper screw-threaded end of the bolt 46.

The arrangement of the groove 47 is such that the horizontal portion of the bolt 46 projects under the bed 20 and thereby prevents the respective side of the carriage 34 from being lifted from said bed. By tightening the thumb nut 49 on the bolt 46, the shoe 36 may be frictionally clamped on the rail 38 to lock the carriage 34 to the bed 20 different distances from the ways 22, to adjust the jig for connecting rods of different lengths.

A pair of thumb screws 50 have screw-threaded engagement with a retaining bar 43, one near each end thereof and positioned when tightened to impinge against the way 40 and frictionally draw the shoe 35 onto the rail 47 and thereby co-operate with the bolt 46 to rigidly secure the carriage 34 to the bed 20. It may be here stated that the rails 37 and 38, guide flange 39 and way 40 are all milled at the same time as the ways 22 so that the carriage 34 always retains a constant relation to the piston A on the ways 22 except as to the adjustment of said carriage toward and from said piston.

A pair of laterally spaced upstanding bearings 51 and 52 are integrally formed with the longitudinal edge portions of the carriage 34 and the seats therein are axially aligned. The axes of these bearings 51 and 52 are parallel to the axes of the wrist pin B and to the bed 20. Formed in the bearing 51 is an open notch-like tool passage 53, for a purpose that will presently appear.

Figure 19:
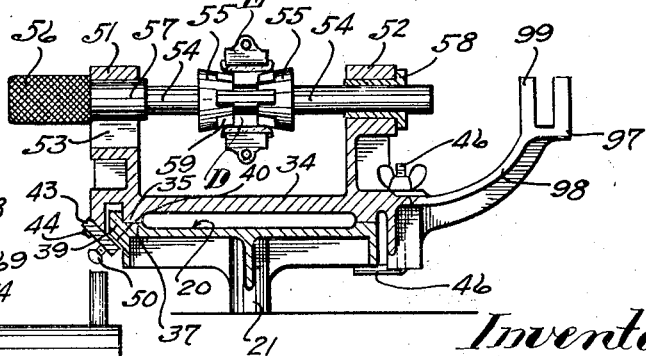
Fig. 19 is a view corresponding to Fig. 6 with the boring bar and feed screw removed and a mandrel and centering cones substituted therefor.

For centering the connecting rod B with the axis of its bushing D axially aligned with the axes of the seats in the bearings 51 and 52, there is provided a mandrel 54 having a diameter less than that of said seats and on which mandrel is loosely mounted a pair of truncated centering cones 55, the bosses of which are turned outward, see Fig. 19.

Formed with one end of the mandrel 54 is a nurled hand-piece 56 and adjacent thereto is a circumferentially expanded portion 57. The other or outer end of the mandrel 54 is mounted in a bushing 58 removably fitted in the bearing 52. The opposing end portions of the centering cones 55 have formed therein a plurality of circumferentially spaced notches 59 so arranged that the respective ends of said cones may be moved into mesh with each other so that the base portions of said cones may be brought relatively close together for centering connecting rod crank shaft bearings of relatively large diameters.

Obviously, by mounting the mandrel 54 as shown in Fig. 19, wherein it extends through the bushing D with the centering cones 55 extending into the ends thereof, said bushing will be accurately held in true axial alignment with said mandrel. With the bushing D thus centered and held, a system of clamps are provided for rigidly securing the connecting rod B to the carriage 34 so that the mandrel 54 and centering cones 55 may be removed from the bushing D and bearings 51 and 52 and said bushing turned to true cylindrical form and otherwise finished to fit a crank on a crank shaft to which it is to be applied.

This system of clamps includes a clamp 60 comprising a pair of substantially parallel vertically extended members 61 and 62, the lower end portions of which afford a pair of co-operating jaws 63 and 64. These clamp members 61 and 62 are intermediately connected by a hand screw 65 and are further connected at their upper ends by a hand screw 66. The hand screw 65 has screw-threaded engagement with the clamp member 61 and loosely extends through a passage in the passage therefor in the clamp member 62 and the head of said screw impinges against the outer face of the clamping member 62 as a base of resistance. The hand screw 66 has screw-threaded engagement with the clamping member 62 and its inner end impinges against the inner face of the clamping member 61.

Figure 12:
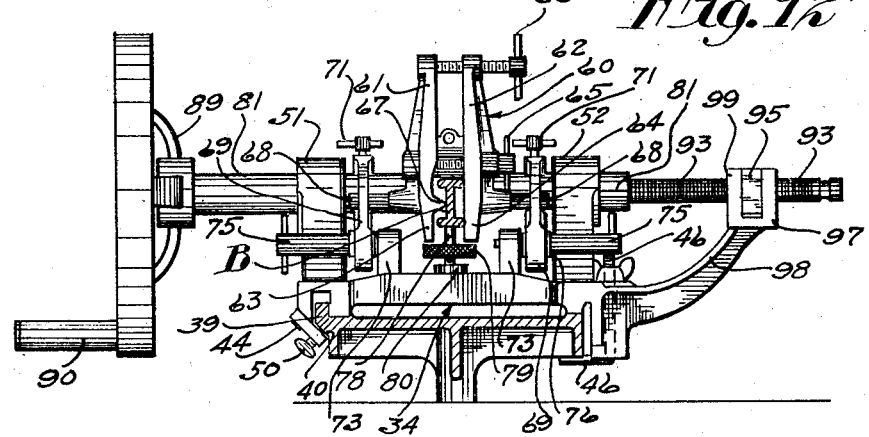
Fig. 12 is a view partly in elevation and partly in transverse vertical section taken on the line 12—12 of Fig. 2.

Integrally formed with the inner face of the jaw 63 is a V-shaped contact point 67 and longitudinally extended serrations 68 are formed in the inner face of the jaw 64 to increase its gripping action. In applying the clamp 60 to the connecting rod B the same is positioned, as best shown in Fig. 12, with the jaws 63 and 64 extending one on each side of said connecting rod. It will be noted that the connecting rod B is I-shaped in cross section and that the clamp 60 has a two-point contact with the respective side of the connecting rod B and that the jaw 63 is out of contact with said rod and that its point 67 impinges against the web of said connecting rod on the opposite side thereof from the jaw 64 and mid-way between its contact with said connecting rod.

Formed with the clamping members 61 and 62 is a pair of reversely and outwardly extended substantially axially aligned trunnions 68 that extend substantially parallel to the axis of the mandrel 54 with the contact point 67 therebetween. Applied to each trunnion 68 is a C-clamp 69 having a V-shaped seat 70 in which said trunnion rests and also having a binding screw 71 that impinges against said trunnion and holds it in said seat. The C-clamps 69 are rigidly and adjustably secured to an anchoring plate 72 which, in turn, is rigidly and adjustably secured to the bed 20 between the bearings 51 and 52 by bolts which extend through longitudinally extended slots in said plates and have threaded engagement with the carriage. Said anchor plate 72 has at its sides upstanding bearing flanges 73 and the C-clamps 69 overlap the bearing flanges 73 and have longitudinally extended slots 74.

Figure 13:
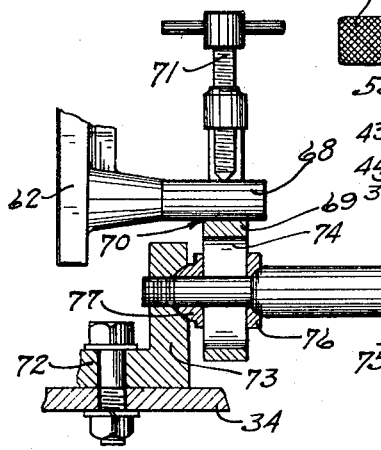
Fig. 13 is a fragmentary detail view partly in elevation and partly in section taken on the line 13—13 of Fig. 2, on an enlarged scale.

The C-clamps 69 are adjustably and rigidly secured to the bearing flanges 73 by binding screws 75 which extend loosely through the slots 74 and have screw-threaded engagement with said bearing flanges, see Fig. 13. Washers 76 on the screws 75 are interposed between the outer faces of the C-clamp 69 and shoulders on the binding screws 75 and have ball and socket contact with said binding screws. These binding screws 75 are further provided with washers 77 interposed between the bearing flanges 73 and C-clamps 69 and have ball and socket contact with said bearing flanges.

Obviously, the arrangement of the system of clamps above described is such that they will automatically adjust themselves to each other and to the parts on which they are mounted without placing any strain on the connecting rod B whatsoever, that would tend to move it out of its position as centered by the cones 55.

A vertically adjustable abutment 78 on which the connecting rod B rests, see Fig. 12, is mounted on the anchoring plate 72. This abutment 78 is in the form of a stem to the intermediate portion of which is secured a nurled operating wheel 79 and the lower end portion of said abutment has screw-threaded engagement with a boss 80 integrally formed with the anchoring plate 72. This abutment 78 is adjusted into engagement with the under side of the connecting rod B before the centering cones 55 are removed from the bushing D to prevent the connecting rod B from being accidentally moved vertically downward between the clamp members 61 and 62.

With the connecting rod B rigidly held by the system of clamps and abutment just described, the mandrel 54 and centering cones 55 are removed leaving the bushing D positioned and rigidly held for boring and finishing, as will hereinafter appear. The attachment for boring the bushing D to the correct diameter and for otherwise finishing said bushing includes a boring bar 81 of such diameter as to snugly fit in the bearings 51 and 52 with freedom for rotary movement and endwise feeding movement.

This boring bar 81 has an intermediate transversely extended tool seat 82 and a radially extended set screw 83 adapted to be positioned in said seat to support and radially project a cutting tool mounted in said seat. For clamping a tool in the cutter bar, a rod 84 is mounted in the tubular outer end portion of the boring bar 81, has screw-threaded engagement therewith and arranged to impinge against a tool in the seat 82 and rigidly hold the same. On the outer end of the screw rod 84 is a head in which is secured a transversely extended pin 85 by which said rod may be rotated.

In Fig. 14 is a tool 86 mounted in the boring bar 81 for boring the bushing D to the desired diameter. A tool 87 is shown in Fig. 17 for filleting the bushing D and a tool 88 is shown in Fig. 18 for finishing the ends of said bushing. Rigidly secured to the outer end of the boring bar 81 is a fly wheel 89 provided with a hand-piece 90 by which the boring bar 81 may be rotated to operate the cutting tool mounted therein. In the rear end of the boring bar 81 is an axially extended cylindrical socket 91 into which a lock pin 92 anchored to the boring bar 81 radially extends. During the application of the boring bar 81 to the bearings 51 and 52 or the removal of the same therefrom, the tool therein moves through its passage 53.

Figs. 2, 14, 15 and 16 show an automatic feed for the boring bar 81 and Figs. 6 and 7 show a hand feed therefor. Said automatic feed includes a screw-threaded rod 93 having unthreaded end portions, either one of which is adapted to be inserted into the socket 91 and provided with a bayonet slot 94 adapted to receive the lock pin 92 and detachably secure the feed screw 93 to the boring bar 81.

A split nut block 95 is applied to the feed screw 93 and provided with a screw 96 for contracting said nut at its split portion and frictionally clamping the same onto the feed screw 93. The nut block 95 is removably mounted between the prongs of a fork 97 on an arm 98 integrally formed with the carriage 34 and which nut block is held from turning by said fork so that the feed screw 93 may be rotated therein and it is also held by said fork against axial movement so as to impart an endwise travelling movement to the feed screw 93 when rotated in the nut block 95. Open notches 99 are formed in the prongs of the fork 97 for the feed screw 93 to permit said nut block to be removed from the fork without detaching the same from the feed screw 93.

The hand feed for the boring bar 81 includes a long screw-threaded rod 100 to the outer end of which is applied a hand wheel 101 by which said feed screw 100 may be turned. The inner end of the feed screw 100 is unthreaded and provided with an annular groove 102. An adapter 103 is provided for attaching the feed screw 100 to the boring bar 101. This adapter 103 has a cylindrical stem 104 arranged to be inserted into the socket 101 on the boring bar 81 and provided with a bayonet slot 105 arranged to receive the lock pin 92 and detachably secure the feed screw 100 to the boring bar 81.

The inner end of the feed screw 100 is mounted in a socket 106 in the outer end of the adapter 103 for axial turning movement and is held swivelled thereto and against removal therefrom by a pin 107 anchored to the adapter 103 and extending into the groove 102, see Fig. 7.

A nut block 108 is applied to the feed screw 100 and adapted to be held in a fork 97 in the same manner that the nut block 95 is held, thus making the automatic feed screw 93 and the hand feed screw 100 interchangeably usable. The nut block 108 may be frictionally clamped onto the feed screw 100 with sufficient friction so that the feed screw 100 will remain stationary during the rotation of the boring bar 81 and thereby hold the boring bar 81 against axial movement. This holding of the feed screw 100 stationary is highly important to prevent axial movement of the feed screw 100 when the finishing tools 87 and 88 are being used, for filleting or finishing the ends of the bushing D.

What we claim is:

1. In a jig for aligning and holding piston assemblies, a bed, means for securing the piston of an assembly in respect to the carriage, a carriage mounted on the bed, bearings on the carriage, means applicable to the bearings for centering the crank shaft bearing of the connecting rod of the piston assembly in respect thereto, adjustable means for securing the connecting rod to the carriage including a clamp having a pair of jaws that have transverse three-point contact with the connecting rod, said jaws having a pair of trunnions, a pair of C-clamps applied to the trunnions for compound axial and circumferential adjustment thereon, binding screws extending through longitudinal slots in the C-clamp and having threaded engagement with the carriage, said seat clamps being self-adjustable on the binding screws and securable in their self adjusted positions, and an adjustable abutment on the carriage for supporting the connecting rod, said bearings being adapted to center and hold a tool for finishing said crank shaft bearing.

2. In a jig for aligning and holding a piston assembly, a bed having a piston aligning way, means for securing the piston of an assembly in the way, a pair of axially spaced bearings, means applicable to the bearings for centering the crank shaft bearing of the assembly in respect thereto, and means for rigidly holding the connecting rod of the assembly in respect to the bearings including a clamp having a pair of jaws applicable to the connecting rod, each provided with a trunnion and multiple jointed connections from each trunnion to one of the bearings and having means for rendering the same rigid, certain of said joints being in the form of clamps adjustably applied to the trunnions.

3. In a jig for aligning and holding a piston assembly, a bed having a piston aligning way, means for securing the piston of an assembly in the way, a pair of axially spaced bearings, means applicable to the bearings for centering the crank shaft bearing of the assembly in respect thereto, and means for rigidly holding the connecting rod of the assembly in respect to the bearings including a clamp having a pair of jaws, each jaw being similarly provided with a trunnion and a multiple jointed connection from each trunnion to a part on the bed, each connection having means for rendering the same rigid, one of the joints in each connection being in the form of a clamp adjustably applied to the respective trunnion.

In testimony whereof we affix our signatures.

ADOLPH STORM.
THOR THORSEN.